Nov. 7, 1967  G. R. SHINDLER  3,351,099
FLUID CONTROLLING APPARATUS
Filed Oct. 12, 1964  4 Sheets—Sheet 4
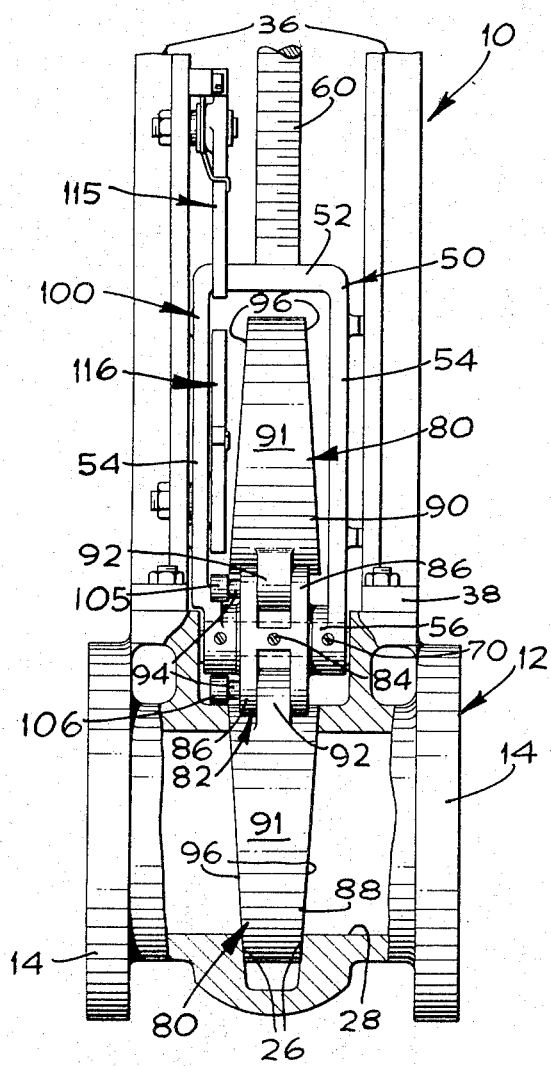
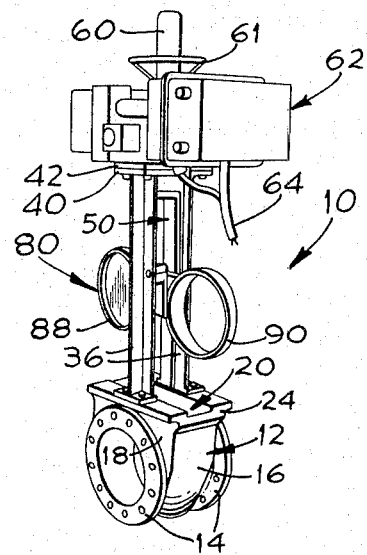
INVENTOR
GEORGE R. SHINDLER
BY *Hans F. Hoffmeister*
ATTORNEY United States Patent Office 3,351,099
Patented Nov. 7, 1967

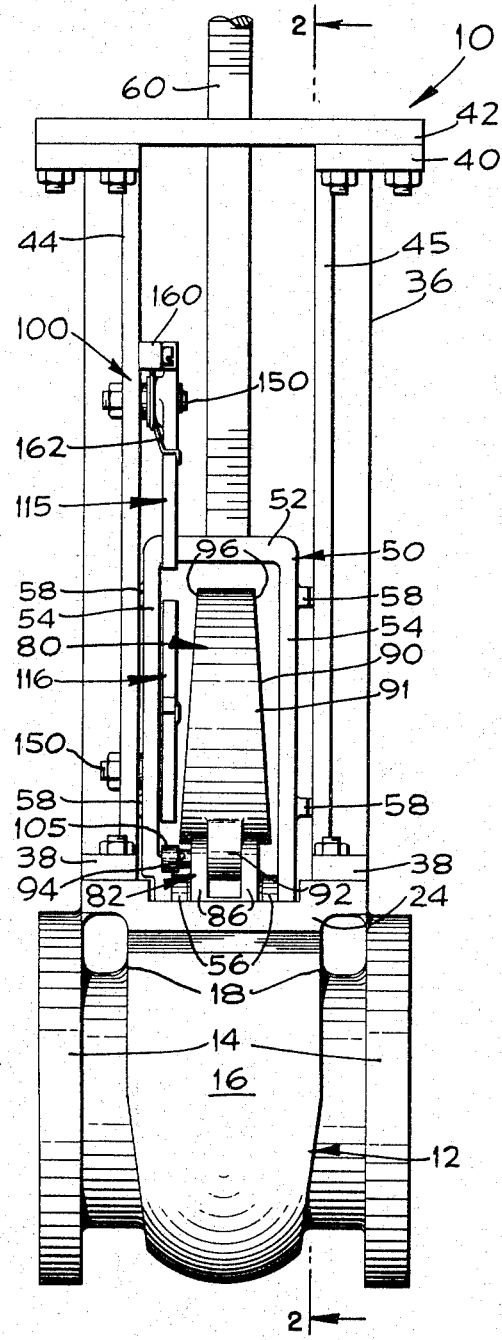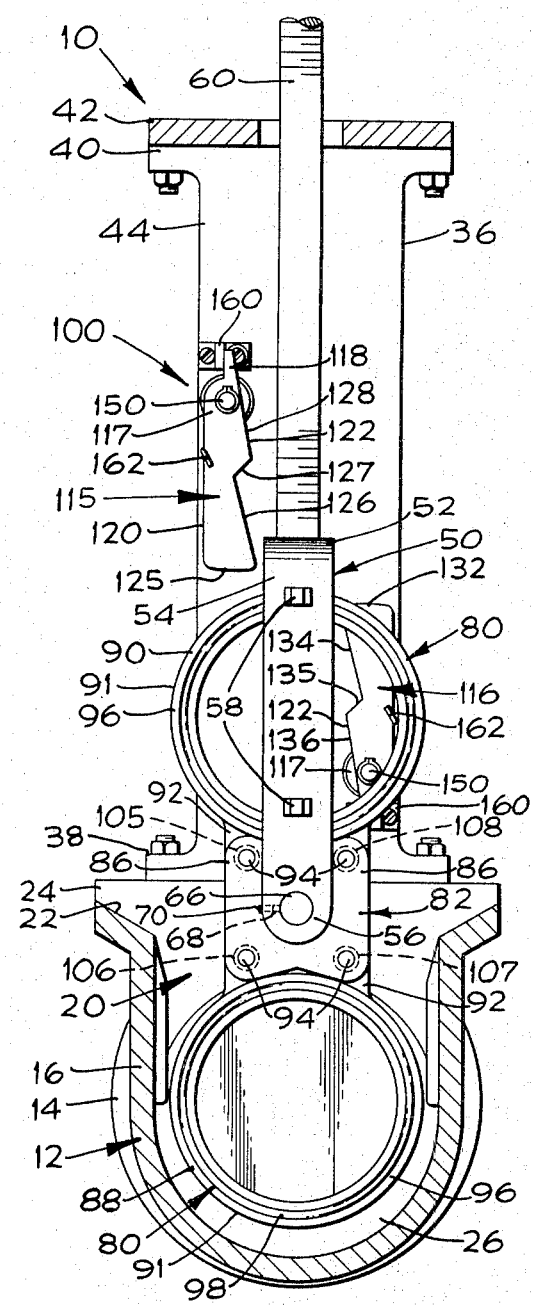

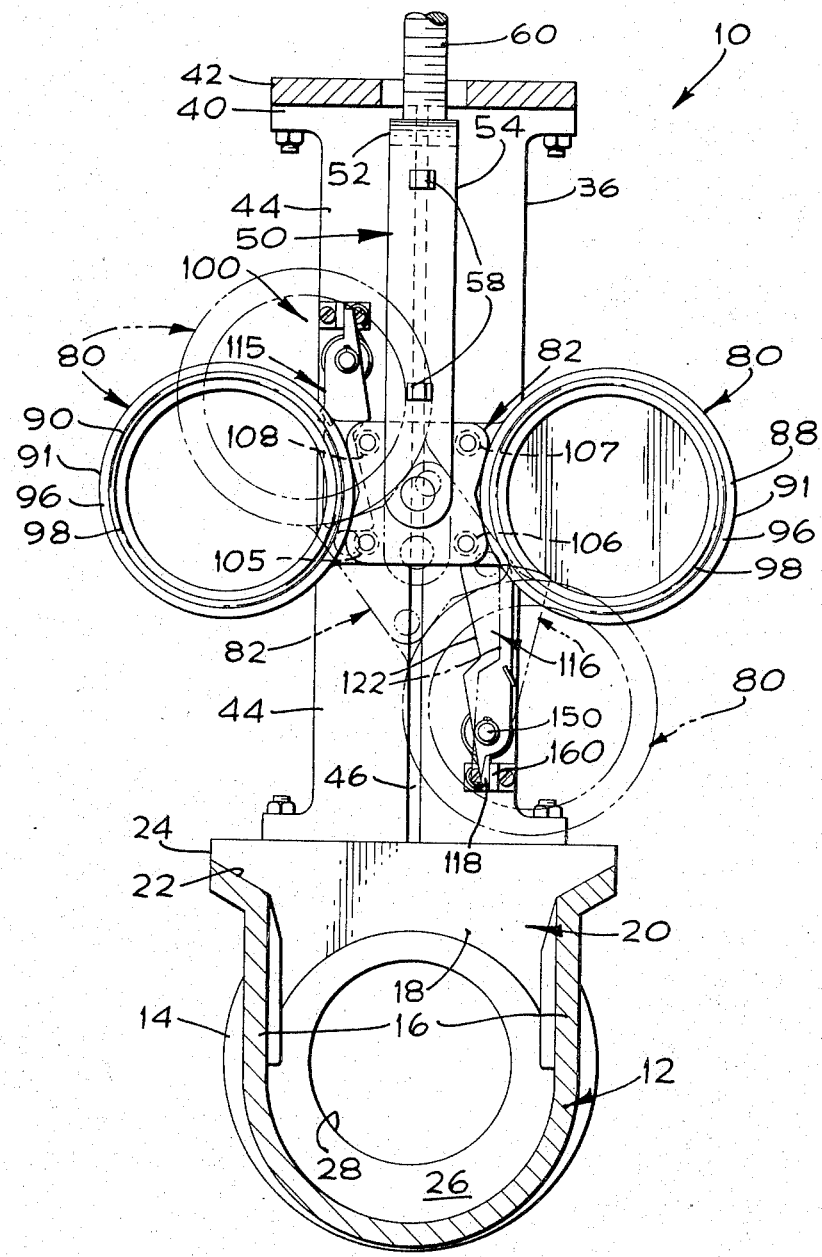

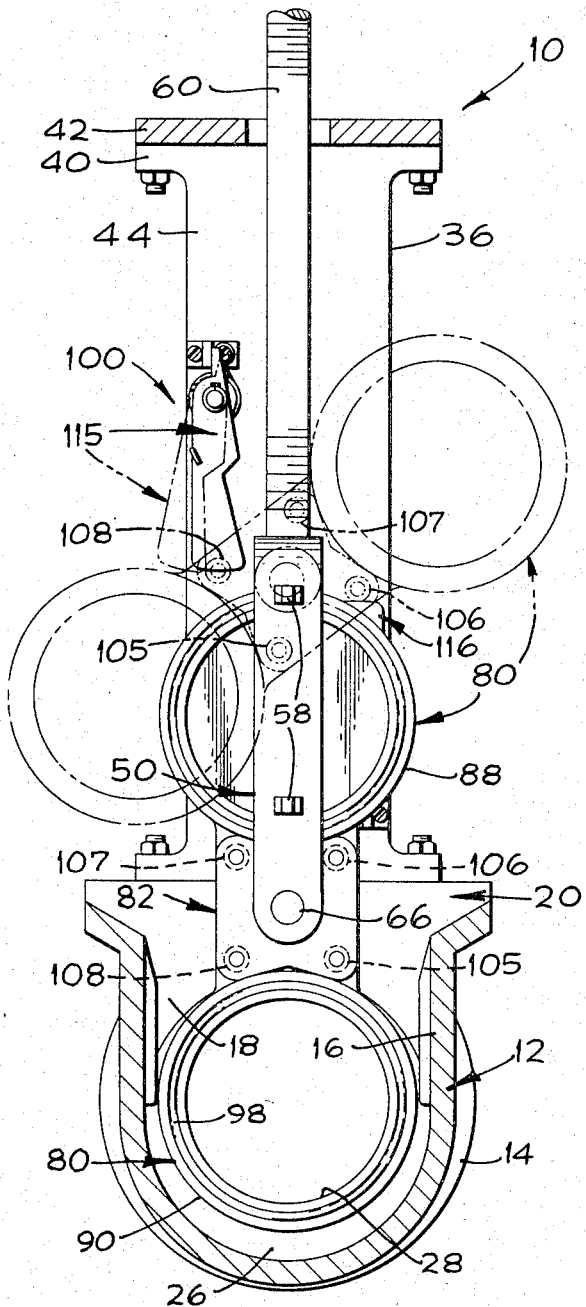

3,351,099
FLUID CONTROLLING APPARATUS
George R. Shindler, Houston, Tex., assignor to FMC Corporation, San Jose, Calif., a corporation of Delaware
Filed Oct. 12, 1964, Ser. No. 403,019
6 Claims. (Cl. 138—94.5)

ABSTRACT OF THE DISCLOSURE

A fluid controlling line blind with a spectacle plate pivotally mounted on a reciprocating carriage, and a pawl mechanism for automatically pivoting the spectacle plate in response to reciprocal movement of the carriage.

---

The present invention pertains to fluid controlling apparatus and more particularly to an automatically operable line blind.

The present invention is especially suited for use in a line blind for automatically changing from one flow controlling portion of the blind to another. By way of background, it is known to provide a line blind including a valve body having a seat which circumscribes a flow passage through the body, a carriage mounted on the body for reciprocating movement along a predetermined path toward and away from the seat between a flow controlling position and a retracted position, and a valve member or spectacle plate pivoted on the carriage so that its blind and open portions can be alternately disposed for registration with the valve seat when the carriage is in its flow controlling position. With known apparatus of this type, however, it has been necessary manually to pivot the spectacle plate when the carriage is in its retracting position so that either the blind or the open portion of the plate is directed toward the seat. In this manner, when the carriage is next moved into its flow controlling position, the selected portion of the plate will be brought into registration with the seat. Because of the necessity of manually pivoting of the plate, the operation of the blind has not been automatic and, therefore, has not been susceptible of remote control.

It is an object of the present invention to provide a fluid controlling apparatus including a valve member having a plurality of flow controlling portions and which is automatically operable to dispose one of its flow controlling portions in a predetermined position.

Another object is to provide an automatically operated line blind.

Another object is to provide a line blind capable of being remotely controlled.

Another object is to provide a line blind wherein a spectacle plate is pivoted on a carriage which moves along a path between flow controlling and retracted positions and wherein the spectacle plate is pivoted end-for-end each time the carriage moves from the flow controlling position to the retracted position and back to the flow controlling position.

Another object is to provide a line blind which automatically pivots its spectacle plate through a portion of the desired amount as the carriage moves towards its retracted position and through the remaining portion of the desired amount as the carriage moves back toward its flow controlling position.

Another object is to provide an automatically operable line blind of the type described where the pivoting movement of the plate is yieldably resisted thereby to compensate for the unbalanced weight of the spectacle plate.

These, together with other objects, will become apparent upon reference to the following description and accompanying drawings, in which:

FIG. 1 is a side elevation of a line blind embodying the present invention.

FIG. 2 is a transverse section taken on a plane at a position indicated by lines 2—2 in FIG. 1 and shows the blind portion of the spectacle plate seated against the valve seat.

FIGS. 3 and 4 are views similar to FIG. 2 but are helpful in understanding how the spectacle plate is moved end-for-end as the carriage is moved from its FIG. 2 position to its FIG. 3 position and then back to its FIG. 2 position, it being noted that the carriage is in the same position in both FIGS. 2 and 4 but that, in FIG. 4, the open portion of the plate is seated against the valve seat.

FIG. 5 is a view similar to FIG. 1 but with portions of the valve body broken away to show the spectacle plate seated in the valve.

FIG. 6 is a perspective of the subject blind and a power operator therefor, both of which are on a scale reduced from that of FIGS. 1 through 5.

With particular reference to the drawings, a visible wedge-type line blind is generally identified by the numeral 10. The blind includes a valve body 12 having a pair of spaced parallel end flanges 14 adapted for connection to conduits, not shown, of a flow line; and a U-shaped side wall 16 and end walls 18 between the flanges which define a chamber or cavity 20 within the body. The side walls have bevelled upper portions 22, and an upper flange 24, normally in a horizontal plane, is secured to end flanges, and side and end walls in surrounding relation to an open top of the chamber.

The valve body 12 provides a pair of confronting annular valve seats 26 in downwardly convergent relation to each other and circumscribing a flow passage 28 through the body. This valve body is of conventional construction, as will be understood, and is not described in any further detail.

Support columns 36 have lower flanges 38 bolted to the upper flange 24 on opposite sides of the chamber 20 and project upward in spaced parallel relation to each other, and upper flanges 40 bolted to a mounting plate 42 which is in spaced parallel relation to the upper flange of the body 12. These support columns also have vertical flanges 44 and 45 providing vertical grooves 46 (FIG. 3) in confronting relation to each other.

A U-shaped carriage or crosshead 50 is mounted on the support columns 36 for vertical reciprocating movement toward and away from the valve seats 26. The carriage includes an upper crossbar 52 and a pair of spaced parallel arms 54 projecting downward from the crossbar. The arms terminate in lower axially aligned spaced bearings 56, with the maximum spacing between said bearings being slightly less than the minimum spacing between the end walls 18 of the valve body 12. Upper and lower tongues 58 project outward from the arms and are fitted in the grooves 46 on their respectively adjacent support columns 36. The carriage is thus mounted for vertical movement in a predetermined path defined by the tongues and grooves, the latter also serving to prevent side or rotational movement of the carriage and to restrict it to its defined path. A valve stem 60 has a lower end secured to the crossbar and an upper end projecting upward through the mounting plate 42. The stem is used to impart vertical movement to the carriage.

Although the stem 60 can be raised and lowered by hand, as by handwheel 61 (FIG. 6), it is preferably raised and lowered by a power operator 62 which is fastened on the mounting plate 42. This operator includes a reversible electric motor having a power cord 64 and drivingly connected to the stem so as to raise and lower the stem upon energization and also includes upper and lower limit switches and a time delay relay which, after actuation of the upper limit switch, serves to reverse the motor after a predetermined time delay. The power operator is not described in any further detail since such details do not in themselves constitute a part of the present invention. It is to be noted, however, that a very satisfactory power operator is that commercially identified as a Limitorque Valve Control SMB–00 manufactured by Philadelphia Gear Corporation whose main office is in King of Prussia (suburban Philadelphia), Pa.

A shaft 66 extends between the bearings 56 and has opposite ends journaled in the bearings. For reasons to be evident in the subsequent description, brakes 68 are mounted in the bearings for movement radially thereof into engagement with the shaft, and setscrews 70 are threaded into the bearings to force the brakes into frictional engagement with the shaft thereby yieldably resisting rotation of the shaft with respect to the bearings. Preferably, the brakes are nylon plugs.

A spectacle plate 80 is mounted on and secured to the shaft 66 for rotational movement between the arms 54 of the carriage 50. Specifically, the carriage includes an intermediate mounting block 82, generally H-shaped in cross-section, located on the shaft between the bearings 56. A pin 84 extends through the block and the shaft so that the block and shaft rotate together with respect to the bearings. The block has spaced pairs of flanges 86 projecting in opposite directions from the shaft so that the block has a generally square shape with four corners when viewed in side elevation (FIGS. 2, 3 and 4). The spectacle plate also includes flow controlling blind and open wedges 88 and 90 respectively. Each wedge has an outer circular edge 91 and an ear 92 fitted between a pair of flanges 86 on the block 82 and connected to the flanges by a pair of pins 94 adjacent to the corners of the block. The wedges project in diametrically opposite directions from the shaft 66 and have opposite endwardly convergent seating faces 96 in which are provided O-rings 98. The wedges are thus displaced 180° from each other.

When the carriage 50, and more specifically the shaft 66, is spaced a sufficient distance above the body 12, the spectacle plate 80 can be pivoted end-for-end so that either of the wedges 88 or 90 can be directed down in alignment with the chamber 20 in the body. Because one of the wedges is blind and the other is open, the spectacle plate is unbalanced about the shaft 66, and, if freely pivotable on the shaft, would always tend to position itself with the blind wedge 88 downward. However, with the brakes 68 frictionally engaging the shaft, the spectacle plate remains in whatever angular attitude it is placed, although being pivotable on the shaft when sufficient turning force is applied.

A significant feature of the present invention pertains to a mechanism, generally identified by the numeral 100 in FIG. 3, for automatically turning the spectacle plate end-for-end each time the carriage 50 moves from its lowermost flow controlling position (FIG. 2 or FIG. 4) to its uppermost retracted position (FIG. 3) and then back again to its flow controlling position. This mechanism includes projections 105, 106, 107, and 108 integrally extending from the pins 94 on the spectacle plate 80. These projections are symmetrically located about the shaft 66 in a square formation and are adjacent to the corners of the mounting block 82. For descriptive convenience, and with reference to FIGS. 2, 3 or 4, these projections will be subsequently referred to as being in one of the following positions: an upper left position, a lower left position, an upper right position, and a lower right position. As will be seen, the projections move successively through these positions as the spectacle plate is pivoted end-for-end.

Cooperating with the projections 105, 106, 107, and 108 to automatically turn the spectacle plate 80 are upper and lower pawls 115, 116. These pawls are identical in shape and include mounting end portions 117, fingers 118 projecting from the mounting end portions, outer edges 120 and inner edges 122. Because of its mounted position, the upper pawl has a lower abutment edge 125 and its inner edge is divided into a lower segment 126 projecting upward and outward in acute angular relation to the lower edge, an intermediate segment 127 projecting upward and inward in obtuse annular relation with the lower segment, and an upper segment 128 projecting upward and outward and merging with the finger. Similarly, the lower pawl has an upper abutment edge 132 and upper, intermediate and lower segments 134, 135, 136.

The upper and lower pawls 115 and 116 (FIGS. 1 and 3) are individually pivoted on pins 150 which are rigidly secured to the vertical flange 44 of one of the columns 36. The pins 150 project inward from the flange 44 on opposite sides of the vertical groove 46 in this flange and mount the pawls so that the upper and lower abutment edges 125 and 132 are located in predetermined positions relative to the paths controlled by the tongues 58 and grooves. More specifically, and with reference to FIG. 2, when the carriage 50 is in its lower flow controlling position, the lower abutment edge 125 of the upper pawl is located in the path of upward movement of the projection 105 which is then in the upper left position, as identified above. Furthermore, when the carriage is in its upper retracted position (FIG. 3), the upper abutment edge 132 is located in the path of downward movement of the projection 106 which is then located in the lower right position.

In order to maintain the pawls 115 and 116 in the described position at the proper time, and yet allow the pawls to move out of such positions when necessary during the end-for-end movement of the plate 80, stops 160 are fastened to the vertical flange 44 above and below the upper and lower pawls, respectively, for engagement by the fingers 118. Coil springs 162 are positioned on the mounting end portions 117 of the pawls and have opposite ends engaging the stops and the pawls for yieldably urging the fingers of the pawls against their respective stops. When the fingers are in engagement with their associated stops, the lower and upper abutment edges 125 and 132 are in the described paths of movement of the projections 105, 106 107, or 108 which are in the upper left and lower right positions. The springs do, however, allow the pawls to move in clockwise directions (FIGS. 3 and 4) away from the carriage 50, when the pawls are engaged by the spectacle plate 80 during its pivoting movement.

In operation, first assume that the spectacle plate 80 is positioned with the blind wedge 88 located against the valve seat 26 so as to block flow through the passage 28. This position of the blind 10 is illustrated in FIG. 2. If it is then desired to invert the spectacle plate 80, in order to permit flow through the passage 28, the stem 60 is raised, either manually or by power, so as to move the carriage 50 from its lowermost flow controlling position along a retracting stroke. With reference to FIG. 3, as the carriage moves upward, the projection 105 eventually strikes the lower abutment edge 125 of the upper pawl 115 whereby counterclockwise turning force is imparted to the spectacle plate 80 since the carriage continues to move upward. As the carriage moves into its upper retracted position, shown in full lines in FIG. 3, the upper pawl forces the spectacle plate into a perpendicular position with respect to the arms 54 of the carriage, it being noted that the projection 108 fits into the recess defined by segments 126 and 127 in the inner edge 122 of the upper pawl. During this pivoting movement of the spectacle plate, a corner of the mounting block 82 engages the inner edge 122 of the lower pawl 116 which pivots outward to accommodate movement therepast of the mounting block, as illustrated in phantom lines in FIG. 3.

After the spectacle plate 80 has been rotated ninety degrees during the upward stroke of the carriage 50 as above described, the carriage is then moved in an advancing stroke downward by moving the stem 60 downward. When the projection 106 strikes the upper abutment edge 132 of the lower pawl 116, turning force in a counter-clockwise direction is again applied to the spectacle plate in order to pivot the plate (FIG. 4) another ninety degrees until the open wedge 90 is directed downward and is in substantial alignment with the chamber 20. Counter-clockwise rotation of the spectacle plate continues slightly past (this position is not shown) one-hundred and eighty degrees from its original position (here assumed to be the FIG. 2) position until the projection 105 engages the inner edge 122 of the lower pawl 116 and forces it outward from under the projection 106 whereupon said turning force is no longer applied to the spectacle plate. Downward movement of the carriage then continues without further rotation of the spectacle plate at least not until the projection 105 moves into a common horizontal plane with the lower pivot pin 150; at this position, the inner edge 122 of the lower pawl bears against this projection 105 and applies a clockwise torque to the spectacle plate 80 causing it to move into a precisely vertical position. Thus, the carriage moves into its flow controlling position with the open wedge 90 being fitted downward between the valve seats 26. It is evident that the projections, in this case 105 and 106, on the right side of the carriage path, as viewed in FIG. 4, must be in a common vertical plane before the spectacle plate can pass the lower pivot pin 150 without further pivoting movement of the plate. If these right side projections are not in a vertical plane, the spectacle plate will pivot to bring them in a common vertical plane.

In view of the foregoing, it is clear that the spectacle plate 80 is pivoted end-for-end as the carriage 50 moves from its flow controlling position, to a retracted position, and then back to the flow controlling position, so as to invert the plate and change from one wedge to another. Turning of the spectacle plate by the cooperative action of the projections 105–108 and the pawls 115 and 116 is facilitated by action of the brakes 68 since they hold the spectacle plate in whatever position it is placed by the turning movement. In other words, there is no tendency for the spectacle plate to pivot into a blind-wedge-down position. Furthermore, it is to be noted that the spectacle plate is not turned by the pawls and projections until the carriage has moved far enough upward so that turning of the spectacle plate is not interfered with by the body 12. Expressed otherwise, the spectacle plate is withdrawn upward out of the body a sufficient distance before pivoting thereof is initiated. Of course, although only one cycle of operation of the blind 10 has been described, it is to be understood that the wedges 88 and 90 are alternately positioned downward upon successive upward and downward strokes of the carriage 50. It is thus apparent that the subject blind is excellently suited for powered and remote operation.

Although a preferred embodiment of the present invention has been shown and described, it will be understood that various changes and modifications may be made in the details thereof without departing from the spirit and scope of the appended claims.

Having thus described the invention, what is claimed as new and desired to be secured by Letters Patent is as follows:

1. In a line blind including a valve body having a valve seat, a carriage, and a valve member having an intermediate portion pivoted on the carriage and a plurality of flow controlling portions projecting away from the intermediate portion in predetermined angular relation to each other, and means mounting the carriage for cyclical movement along a path toward and away from the seat with each cycle including a stroke of the carriage away from the seat followed by a stroke of the carriage toward the seat; an apparatus for pivoting the valve member comprising means operable during each cycle of movement of the carriage for pivoting said valve member through said predetermined angle to successively direct said flow controlling portions toward said seat, said means including first and second pawls mounted on opposite sides and spaced lengthwise of said path and projections on the intermediate portion of the valve member, one of said projections being in alignment with said first pawl during movement of the carriage away from the seat so that engagement of said one projection with the first pawl causes said valve member to pivot through half of said angle, and another of said projections being aligned with said second pawl during movement of the carriage toward said seat so that engagement of said other projection with said second pawl causes said valve member to pivot through the remaining half of said angle.

2. In the blind of claim 1 wherein said pawls are movable away from said path in order to accommodate pivotable movement of said valve member, and wherein means are provided for rotatably urging said pawls into said positions of alignment with the projections.

3. In the blind of claim 1 wherein there are only two flow controlling portions, wherein said predetermined angle is 180°, and wherein there are four projections equidistantly positioned in rectangular relation about the pivot axis of the valve member.

4. In the blind of claim 1 wherein said body has a chamber in which said seat is located and wherein said first pawl is spaced at a distance from the body such that the valve member does not engage the body when pivotable movement of the valve member is caused by engagement of said one projection with said first pawl.

5. In a line blind including a valve body having a valve seat, a carriage, and a valve member having an intermediate portion pivoted on the carriage and a plurality of flow controlling portions projecting away from the intermediate portion in predetermined angular relation to each other, and means mounting the carriage for cyclical movement along a path toward and away from the seat with each cycle including a stroke of the carriage away from the seat followed by a stroke of the carriage toward the seat; an apparatus for pivoting the valve member comprising means operable during each cycle of movement of the carriage for pivoting said valve member through said predetermined angle to successively direct said flow controlling portions toward said seat, and means rotatably resisting pivotal movement of said valve member.

6. In the blind of claim 1 wherein said valve member is pivoted on said carriage by a shaft journalled in the carriage, and wherein said resisting means includes a brake member engaging said shaft and means urging said brake member against the shaft.

References Cited
UNITED STATES PATENTS

| | | | |
|---|---|---|---|
| 2,556,010 | 6/1951 | Swanson | 74—88 |
| 2,665,589 | 1/1954 | Risher | 74—88 |
| 2,845,954 | 8/1958 | Hamer | 138—94.5 |
| 2,861,599 | 11/1958 | Hamer | 138—94.3 |
| 2,931,394 | 5/1960 | Hamer | 138—94.5 |
| 2,933,930 | 5/1960 | Huhn | 74—88 X |

LAVERNE D. GEIGER, *Primary Examiner.*

C. L. HOUCK, *Assistant Examiner.*